(12) United States Patent
Johnson

(10) Patent No.: US 6,729,599 B2
(45) Date of Patent: May 4, 2004

(54) LIQUID MICROVALVE

(75) Inventor: A. David Johnson, San Leandro, CA (US)

(73) Assignee: TiNi Alloy Company, San Leandro, CA (US)

( * ) Notice: Subject to any disclaimer, the term of this patent is extended or adjusted under 35 U.S.C. 154(b) by 127 days.

(21) Appl. No.: 10/179,701

(22) Filed: Jun. 24, 2002

(65) Prior Publication Data

US 2002/0195579 A1 Dec. 26, 2002

Related U.S. Application Data

(60) Provisional application No. 60/301,222, filed on Jun. 26, 2001.

(51) Int. Cl.[7] .......................... F16K 31/00; F16K 31/18
(52) U.S. Cl. .................................... 251/11; 251/129.06
(58) Field of Search ............................. 251/11, 129.01, 251/358, 129.06

(56) References Cited

U.S. PATENT DOCUMENTS

| | | | | |
|---|---|---|---|---|
| 5,325,880 A | * | 7/1994 | Johnson et al. ............ 137/1 |
| 5,619,177 A | * | 4/1997 | Johnson et al. ............ 337/140 |
| 6,406,605 B1 | * | 6/2002 | Moles ........................ 204/601 |
| 6,470,108 B1 | * | 10/2002 | Johnson ...................... 385/18 |

* cited by examiner

Primary Examiner—Edward K. Look
Assistant Examiner—John K Fristoe, Jr.
(74) Attorney, Agent, or Firm—Richard E. Backus

(57) ABSTRACT

A valve for the control of fluid flow in microsize systems, such as for transfer of small samples of blood for processing. An actuator beam comprised of a microribbon formed of a shape memory alloy is in a normally closed position where inlet and outlet ports of the valve are closed. In this position a compliant member presses against and holds the microribbon, together with a compliant tape carried below the microribbon, against the ports. The valve is actuated by heating the alloy through its crystalline phase change transition temperature. The resulting change of the microribbon to its memory shape moves the microribbon and tape away from the ports, enabling fluid flow through between the ports in a valve-open mode. The microribbon and tape are held in the valve-open mode when the alloy cools below the transition temperature by a force applied from a heat-shrinkable layer carried on the upper side of the microribbon.

5 Claims, 1 Drawing Sheet

LIQUID MICROVALVE

CROSS-REFERENCE TO PRIOR APPLICATION

This application claims the benefit under 35 USC §119(e) of U.S. provisional application serial No. 60/301,222 filed Jun. 26, 2001.

BACKGROUND OF THE INVENTION

Field of the Invention

This invention relates in general to liquid control valves of micro size.

OBJECTS AND SUMMARY OF THE INVENTION

It is a general object of the invention to provide a new and improved valve of micro size for use in controlling the flow of liquids.

More particularly, it is an object to provide a one-time opening microvalve for use in applications such as blood sampling.

DESCRIPTION OF THE PREFERRED EMBODIMENTS

Figure 1:
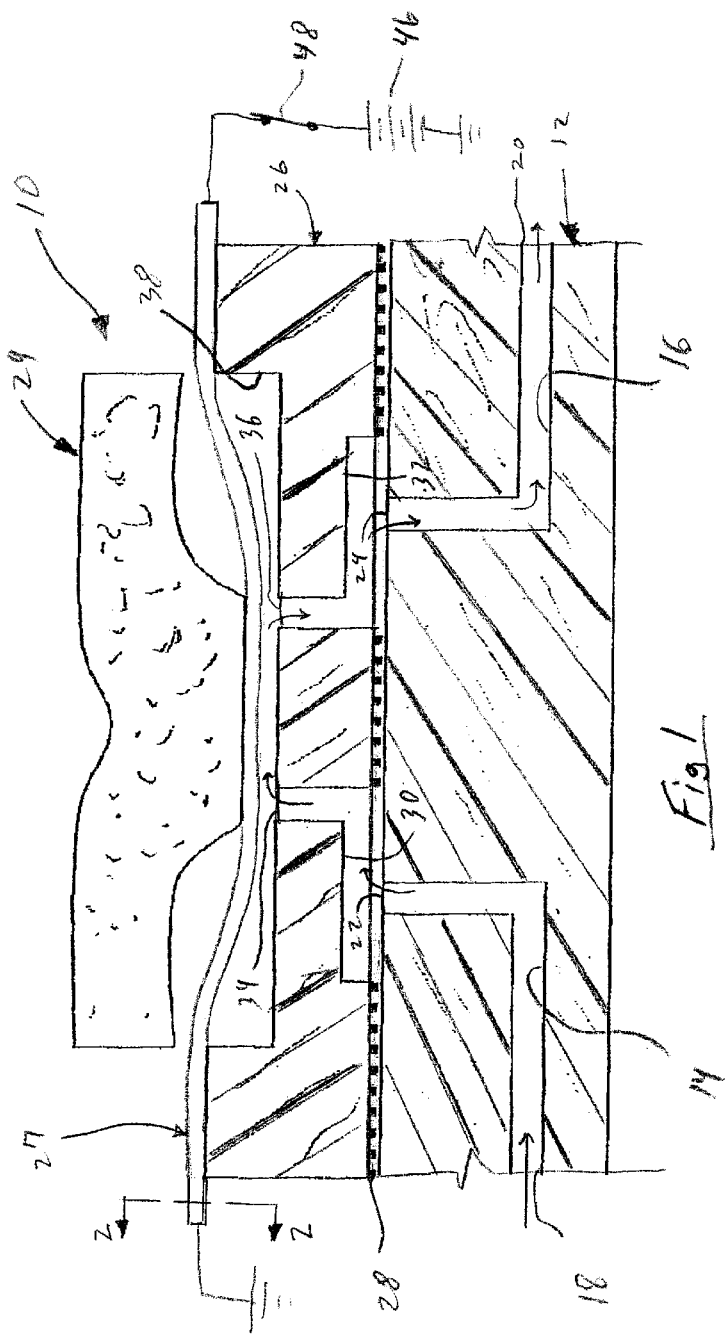
FIG. 1 is a cross section view of a micro valve of one embodiment of the invention.

In the drawings FIG. 1 illustrates a valve 10 of micro size in accordance with one preferred embodiment of the invention. Valve 10 is shown as adapted for controlling a liquid, such as blood, that is contained in a processing chamber or other volume, not shown. In such an application the valve would be actuated into a one-time opening mode that establishes a flowpath for allowing a blood sample to flow from the chamber.

Valve 10 is a component of a printed circuit ("PC") board 12. The PC board is formed with flow channels 14, 16 having respective ends 18, 20 for directing the liquid to and/or from the processing or other chambers. The channels emerge through respective openings 22, 24 in the top surface of board 12. One channel can provide a flow inlet into the valve and the other an outlet.

The principal components of valve 10 comprise an insert or valve body 26, composite actuator beam 27 and compliant member 29.

Insert 26, which can be injection molded from a suitable plastics material, is attached by means such as an adhesive layer 28 to the top of the PC board. The insert is formed on its bottom side with openings 30, 32 which are in register above the PC board with openings 22 and 24. The openings 30, 32 lead to a pair of ports 34, 36 which are precisely located and accurately formed to provide a good fluid-tight sealing relationship with the bottom of actuator beam 27 for closing the ports in the manner explained below. The configuration of the insert enables the valve to be mounted on a PC board that may not be precisely made such that its surface would not be flat enough to form a good seal with the actuator beam.

The top side of insert 26 is formed with a shallow depression 38 which forms a void into which portions of the actuator beam are inserted under pressure.

Figure 2:
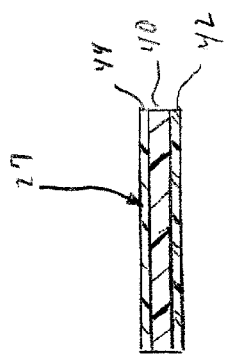
FIG. 2 is an enlarged cross section view taken along the line 2—2 of FIG. 1.

Actuator beam 27 is positioned directly above the insert. As shown in FIG. 2, the beam is comprised of a thin microribbon 40 at the middle, compliant tape 42 on the bottom and heat-shrinkable layer 44 on top. Microribbon 40 is formed of a shape memory alloy ("SMA") material, such as TiNi which is an alloy of nearly equal atomic weights of titanium and nickel. The SMA material can be made in thin film or microribbon configurations by sputter deposition in accordance the teachings of U.S. Pat. Nos. 5,061,914 to Busch and 5,325,880 to Johnson, the disclosures of which are incorporated by this reference. During formation, the SMA material is deposited in a naive state and is then "trained" to give it a shape memory property by annealing and prestraining. The prestraining stretches or elongates the microribbon from its memory shape.

As used herein in reference to member 29 and tape 42, "compliant" means that the member or tape can elastically yield to conform with the shape or contour of a surface or object against which it is pressed. The resulting compression of the member or tape causes the compliant material of which they are formed to apply an elastic restoring force against the surface or object.

The SMA microribbon is actuated by Joule heating from a suitable electric current source, shown schematically as a power circuit comprising battery 46 and switch 48 connected in series with the microribbon. The SMA material undergoes a crystalline phase transformation from martensite to austenite when heated through its phase change transformation temperature. During such transformation the material forcefully deforms toward the memory shape to which it is trained by annealing. When below the transformation temperature in a "cold state" the material can be plastically deformed responsive to stress. As used herein, the term "heated through" with reference to the phase change transformation temperature includes both heating the alloy to within the relatively narrow temperature band at which the transformation takes place, and to heating to a higher temperature.

Compliant tape 42 is formed of a suitable liquid-impervious, compliant material which has sufficient elasticity to enable it to form a good fluid-tight seal with ports 34 and 36 when pressed against them and to also apply an elastic restoring force when stretched. For that purpose, the tape can be formed of Kapton™, which is a trade name for a polyimide material. During assembly, the Kapton tape is pressed down by the elastic pressure from compliant member 29. This stretches the Kapton tape and causes the prestraining of SMA microribbon 40.

Heat-shrinkable layer 44 is positioned above the microribbon layer and is formed of a synthetic polymer material which contracts when heated, such as blended PVC of the type used for shrink-wrap film in commercial packaging systems. Layer 44 is held in place by compliant member 29.

Compliant member 29 is formed of a suitable soft and compressible synthetic polymer material, such as polyurethane foam, which exerts an elastic restoring force when compressed. Member 29 is mounted against the actuator beam in a compressed state so as to exert a small downward pressure, on the order of about 5 psi, on the underlying layers. This pressure forces Kapton tape 42 against the ports of insert 26 to keep them closed.

For actuation after SMA microribbon 40 has been prestrained, current from the power source is switched on so that the microribbon is heated and undergoes the crystalline phase transformation, thereby contracting in length toward its memory shape. Some of the heat generated in the microribbon is also conducted into heat-shrinkable layer 44, causing it to contract and create a stress force acting upward against the microribbon. The combination of these two contractions pulls Kapton tape 42 up and out of contact with the ports. This enables a flowpath between the two ports so that liquid can flow between ends 18, 20 of the flow channels. When the current is switched off and the SMA material cools below its transformation temperature, the actuator beam remains in its contracted configuration, keeping the liquid flowpath open. Also, the heat-shrinkable layer 44 retains its contacted form. The result is that the Kapton tape is prevented from re-establishing contact with ports 34 and 36, and the valve remains open in the power-off mode. This enables liquid flow to continue without interruption as long as there is pressure from the liquid source.

What is claimed is:

1. A microvalve for controlling the flow of a fluid between an inlet and an outlet, the microvalve comprising the combination of a valve body having a surface formed with a first port that is in fluid communication with the inlet and a second port that is in fluid communication with the outlet, an actuator beam positioned above the surface, the actuator beam being comprised of a shape memory alloy which undergoes a crystalline phase transformation and resulting change to a memory shape from a plastically deformed shape when heated through the alloy's phase change transformation temperature, a compliant member positioned above the actuator beam, the compliant member exerting an elastic restoring force when compressed, the actuator beam when the alloy is in the memory shape being spaced from the first and second ports a distance sufficient to enable flow therethrough and to also cause the actuator beam to engage with and compress the compliant member, the elastic restoring force acting against and deforming the actuator beam to the deformed shape when the alloy is below the phase change transformation temperature, the actuator beam in the deformed shape being in a position which occludes the first and second ports sufficient to prevent fluid flow through the ports, and the actuator beam comprises a heat-shrinkable layer carried on a side of the actuator beam which faces the compliant member, the heat-shrinkable layer being in a contracted shape responsive to the heating of the alloy, the layer in the contracted shape having a stress force that is applied to urge the actuator beam away from the ports, the stress force being sufficient to hold the actuator beam away from the ports when temperature of the alloy is below the phase change transformation temperature.

2. A microvalve as in claim 1 in which the actuator beam comprises a sputter-deposited microribbon.

3. A microvalve as in claim 1 in which the change to the memory shape is by contraction of the shape memory alloy.

4. A microvalve as in claim 1 in which the actuator beam further comprises a compliant tape carried on a side of the actuator beam which faces the ports, the tape having sufficient elasticity to substantially conform with the valve body surface and form a fluid seal about the ports responsive to being pressed against the surface when the actuator beam is in the deformed shape.

5. A microvalve as in claim 4 in which the compliant tape is stretched when the actuator beam is in the deformed shape, and the elasticity is sufficient to cause the tape to apply an upward restoring force against the actuator beam.

* * * * *